Patented Mar. 7, 1944

2,343,472

UNITED STATES PATENT OFFICE 2,343,472

CATALYTIC CRACKING OF HYDROCARBONS

Mathias Pier, Heidelberg, and Gerhard Free, Ludwigshafen-on-the-Rhine, Germany; vested in the Alien Property Custodian No Drawing. Application May 6, 1941, Serial No. 392,114. In Germany May 6, 1940

6 Claims. (Cl. 196—49)

The present invention relates to the catalytic cracking of hydrocarbons.

We have found that in the cracking of hydrocarbon oils mainly boiling above 250° C. by leading them over rigidly arranged catalysts the yield of low-boiling substances, in particular non-knocking motor fuels, can be increased and the nature of the products improved if the starting materials are passed through more than one reaction zone, the material being introduced into the first zone at an elevated pressure not higher than 25 atmospheres and the pressure being reduced between at least two reaction zones by at least 5 atmospheres, for example by means of regulating valves, without substantially reducing the temperature, the last reaction zone containing synthetic magnesium silicate as a cracking catalyst. At least in the last reaction zone the initial materials are to be completely in a vaporous state.

As initial materials there may be mentioned in particular hydrocarbons rich in hydrogen and capable of being vaporized under the reaction conditions obtained for example from petroleums, destructive hydrogenation products and the like, for example heavy oils which may contain constituents of middle oil character. The hydrocarbon mixtures obtained by the reduction of carbon monoxide are especially suitable initial materials. Hydrocarbons rich in hydrogen may also be worked up in admixture with hydrocarbons lower in hydrogen, in particular aromatic hydrocarbons.

From the initial materials rich in hydrogen there are thus obtained in good yields benzines which are non-knocking and contain comparatively small amounts of unsaturated hydrocarbons because during the treatment there takes place an isomerization of the hydrocarbons which causes a high octane number and high lead susceptibility.

The process according to the present invention is carried out in the first reaction zone at a pressure of from 5 to 25 atmospheres, especially at a pressure of from 5 to 15 atmospheres, and then, without separation of the benzine formed, in the second zone at a lower pressure, preferably at a pressure lower by from 5 to 25 atmospheres than that first used. It is advantageous to work in the last zone under atmospheric pressure. Temperatures of from 350° to 700°, preferably from 400° to 600° C., are used and the temperatures in the single pressure stages may be approximately the same. However, the process may also be carried out at increasing temperatures; the increase may amount to from 10° to 100°, preferably from 15° to 50° C.

As has been mentioned above, the last reaction zone, i. e., the one operated at a lower pressure, contains a synthetic magnesium silicate as a cracking catalyst. The said silicate may be prepared, for example, by uniting an acidified water glass solution with a magnesium salt solution, for example a solution of magnesium chloride, washing the resulting jelly or hydrogel and drying and heating it. The magnesium may be dissolved out in part during the manufacture of the catalyst or from the finished catalyst, for example by means of an appropriate acid. The reaction zone operated at higher pressure may be kept free from catalysts and be empty or, if desired, provided only with adsorbing agents, such as for example bleaching earth or alumina or active carbon or inert filler substances, as for instance pumice stone, clay sherds or Raschig rings, or there may be used a less strongly active catalyst, as for example a catalyst which has been used for a long time.

The catalysts are usually used for only a short time, as for example from 20 minutes to 2 hours, and then regenerated, for example with gases containing oxygen, preferably those having gradually increasing oxygen content, at increasing temperature, and then used again, if desired in admixture with fresh catalyst.

The following examples will further illustrate the nature of this invention but the invention is not restricted to these examples.

Example 1

Two reaction chambers connected in series and arranged one above the other are filled with catalysts in the form of pieces, the catalyst in the first chamber consisting of bleaching earth and that in the second chamber of magnesium silicate prepared according to the application Ser. No. 222,144, filed July 30, 1938. The reaction chambers are heated to 460° C. A regulating valve is provided in the connecting pipe. A middle oil obtained from German petroleum and boiling between 250° and 390° C. is led in a preheated condition into the upper part of the first chamber, the regulating valve being closed. By reason of the vaporization of the oil, an increased pressure is set up in the first chamber. The regulating valve is then opened in such a manner that a pressure of 20 atmospheres is maintained in the first chamber. The product released from pressure passes then into the second chamber at the same temperature and over the magnesium silicate catalyst. The throughput amounts to 0.5 liter of oil per liter of catalyst per hour.

By working in this way there are obtained 35 per cent of benzine having an iodine value of 40 and an octane number of 72 (Motor method). It is very sensitive to lead and has for example an octane number of 85 after the addition of 0.09 per cent of lead tetra-ethyl. The benzine also has a good stability in storage.

*Example 2*

An asphalt base petroleum distillate with an initial boiling point of 250° C. of which 40 per cent boil up to 350° C. is passed at 480° C. through a reaction chamber which is filled with lumps of a burnt clay; this chamber may be closed by a valve and a pressure of 10 atmospheres is produced in it by the vaporization of the oil which pressure is constantly maintained by the valve. The oil vapors are continuously released to atmospheric pressure into a second reaction chamber which is filled with magnesium silicate synthetically produced, whereby the throughput is 1 liter of oil per 1 liter of catalyst. A reaction product is obtained with 28 per cent of benzine.

What we claim is:

1. A process for the production of a non-knocking motor fuel, which comprises passing a hydrocarbon fluid mainly boiling above 250° C. and capable of being vaporized under the reaction conditions, at a cracking temperature through more than one reaction zone, the initial material being introduced at a pressure not higher than 25 atmospheres and the pressure between at least two reaction zones being reduced by at least 5 atmospheres without substantially reducing the temperature, the last reaction zone containing a synthetic magnesium silicate as a cracking catalyst and thereby surpassing any previous reaction zone as to the catalytic cracking effect.

2. The process as claimed in claim 1 in which the reaction zone with the highest pressure is provided with a less strongly active cracking catalyst.

3. The process as claimed in claim 1 in which the reaction zone with the highest pressure is provided with an adsorbing agent.

4. The process as claimed in claim 1 in which the reaction zone with the highest pressure is free from catalyst.

5. A process for the production of a non-knocking motor fuel, which comprises passing a hydrocarbon fluid mainly boiling above 250° C. and capable of being vaporized under the reaction conditions, at a cracking temperature through two reaction zones in succession, maintaining a superatmospheric pressure of at the most 25 atmospheres in the first reaction zone, reducing the pressure on the hydrocarbon fluid by at least about 5 atmospheres before passing it to the second reaction zone without substantially reducing the temperature, said last mentioned reaction zone containing a synthetic magnesium silicate as a cracking catalyst and thereby surpassing said first reaction zone as to the catalytic cracking effect.

6. A process for the production of a non-knocking motor fuel, which comprises passing a hydrocarbon fluid mainly boiling above 250° C. and capable of being vaporized under the reaction conditions, at a cracking temperature through two reaction zones in succession, maintaining a superatmospheric pressure of about 10 atmospheres in the first reaction zone which zone is provided with an adsorbing agent, reducing the pressure on the hydrocarbon fluid to about atmospheric pressure before passing it in the vapor phase to the second reaction zone without substantially reducing the temperature, said last mentioned reaction zone containing a synthetic magnesium silicate as a cracking catalyst.

MATHIAS PIER.
GERHARD FREE.